(12) United States Patent
Wilkerson

(10) Patent No.: US 6,220,810 B1
(45) Date of Patent: *Apr. 24, 2001

(54) CHAIN DRIVEN BELT DISCHARGE APPARATUS AND METHOD

(75) Inventor: Lee Wilkerson, So. Hazelton (CA)

(73) Assignee: Star Transport Trailer, Inc., Sunnyside, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,063

(22) Filed: May 11, 1999

(51) Int. Cl.[7] ............... B60P 1/38; A01D 90/10; B65G 17/02
(52) U.S. Cl. .................. 414/528; 414/813; 198/833
(58) Field of Search .................. 414/528, 813; 198/833

(56) References Cited

U.S. PATENT DOCUMENTS

| | | | |
|---|---|---|---|
| 1,519,340 | * 12/1924 | Smith | 414/528 |
| 2,609,115 | 9/1952 | Oklejas | 241/83.26 |
| 2,670,863 | 3/1954 | Stanley | 214/301 |
| 2,791,339 | * 5/1957 | Sprague | 414/528 X |
| 3,134,480 | 5/1964 | Loosli | 198/117 |
| 3,278,056 | 10/1966 | Beucler et al. | 214/83.2 |
| 3,317,066 | * 5/1967 | Hamm | 414/528 |
| 3,482,717 | 12/1969 | Moser | 214/83.36 |
| 3,498,486 | 3/1970 | Freeman, Jr. | 214/501 |
| 3,593,864 | 7/1971 | Moser | 214/83.36 |
| 3,913,760 | 10/1975 | Koral | 214/83.36 |
| 4,055,265 | * 10/1977 | Eisenman | 414/528 X |
| 4,664,583 | 5/1987 | Gust | 414/528 |
| 5,102,285 | * 4/1992 | Gust | 414/528 |
| 5,118,244 | * 6/1992 | Cook | 414/528 |
| 5,727,474 | * 3/1998 | Theurer et al. | 414/528 X |
| 5,772,389 | * 6/1998 | Feller | 414/528 X |
| 5,934,862 | * 8/1999 | Brown et al. | 414/528 |

* cited by examiner

Primary Examiner—Robert P. Olszewski
Assistant Examiner—Gerald J. O'Connor
(74) Attorney, Agent, or Firm—Stratton Ballew PLLC

(57) ABSTRACT

A device for moving bulk flow material is provided. The device includes an idler sprocket assembly and a drive sprocket assembly. The drive sprocket assembly is engaged with a motor, which turns the drive sprocket assembly. Endless loop drive chains are functionally engaged on the idler sprocket assembly and the drive sprocket assembly. Spacer bars are positioned perpendicular to and attached to the endless loop drive chains. A conveyor belt is received loosely on the endless loop drive chains, covering the endless loop drive chains and leaving slack in the conveyor belt. A method for moving bulk flow material is also provided. According to the method, the motor turns the drive sprocket assembly, advancing the drive chains. The weight of the bulk flow material presses the conveyor belt against the chains, creating friction which advances the conveyor belt.

18 Claims, 5 Drawing Sheets

CHAIN DRIVEN BELT DISCHARGE APPARATUS AND METHOD

TECHNICAL FIELD

This invention relates to the field of material handling equipment. More specifically, the invention relates to a chain-driven apparatus for moving agricultural products and other bulk flow materials.

BACKGROUND OF THE INVENTION

In the agriculture industry, it is common to load agricultural products such as potatoes into a trailer for transport from the field to a storage facility. Most conventional agricultural trailers are open on top, so that produce can be loaded easily by automated picking equipment. There are various means known for emptying the contents of an agricultural trailer. One common method is to employ a chain driven belt to carry the contents to the rear of the trailer, where they are discharged out a rear gate. In a typical arrangement, a conveyor belt affixed to a pair of endless drive chains extends along the floor of the trailer. The chains are received by a pair of freely turning sprockets at the front end of the trailer, and a second pair of sprockets at the rear end of the trailer. The second pair of sprockets are turned by a motor, pulling the upper run of the drive chains from the front of the trailer to the rear, and the lower run of the drive chains from the rear of the trailer to the front.

While functional, the currently known chain driven belt discharge device is problematic. When used to unload agricultural products such as potatoes, which are mixed with dirt, mud, and/or rocks when harvested, the chain drive can be damaged by debris which slips under the belt and becomes caught in the chain. Attempts have been made to avoid this problem by using a belt made up of a plurality of relatively lightweight overlapping flaps. Each flap is affixed to the chain drive at the flap leading edge, and its trailing edge is unattached. A spacer bar affixed between the drive chains supports each flap. The flaps form a flat surface on the upper run of the chain drive. As the belt is advanced to the rear of the trailer and the produce is offloaded, each flap rotates around to the lower run of the chain drive. The unattached trailing edge is free to hang vertically from the chain drive. Thus, any debris which may have entered the belt drive apparatus is free to fall through to the ground without causing damage to the chain drive. While somewhat effective at reducing problems associated with rocks, dirt and mud damaging the chain drive, the flap-belt device is expensive to manufacture, and adds unwanted weight to the trailer due to the many spacer bars required. Additionally, the flap belt device requires more maintenance than a conventional conveyor belt design.

Another problem with the currently known chain driven belt discharge device is that when the belt becomes worn or damaged, it must be detached from the chain drive for replacement. This process can be time consuming, especially when the belt has been affixed to the chain drive every 12 to 18 inches. To avoid this problem, attempts have been made to use a relatively thin belt that relies on tension between two or more rollers to hold it in position. However, such a design has been proven to be problematic, requiring high maintenance and frequent replacement to keep the belt in position.

It would be advantageous, therefore, to have a chain driven belt discharge device which does not require that the belt be affixed to the chain drive or held in place by tension between two rollers.

It would also be desirable to have a chain driven belt discharge device which is relatively lightweight.

It would further be desirable to have a chain driven belt discharge device which permits relatively rapid and simple change of worn or damaged belts.

SUMMARY OF THE INVENTION

According to the invention, a device for moving bulk flow material is provided. The device includes an idler sprocket assembly and a drive sprocket assembly. The drive sprocket assembly is engaged with a motor, which turns the drive sprocket assembly. A first endless loop drive chain and a second endless loop drive chain are parallel to one another, and functionally engaged on the idler sprocket assembly and the drive sprocket assembly. Spacer bars are positioned perpendicular and attached to the endless loop drive chains. A conveyor belt is received loosely on the endless loop drive chains, covering the endless loop drive chains and leaving slack in the conveyor belt. According to an aspect of the invention, sloped side walls are provided to direct the bulk flow material onto the conveyor belt. In the method of the invention, the motor turns the drive sprocket assembly, advancing the drive chains. The weight of the bulk flow material presses the conveyor belt against the chains, creating friction which advances the conveyor belt.

DETAILED DESCRIPTION OF SPECIFIC EMBODIMENTS

Figure 1:
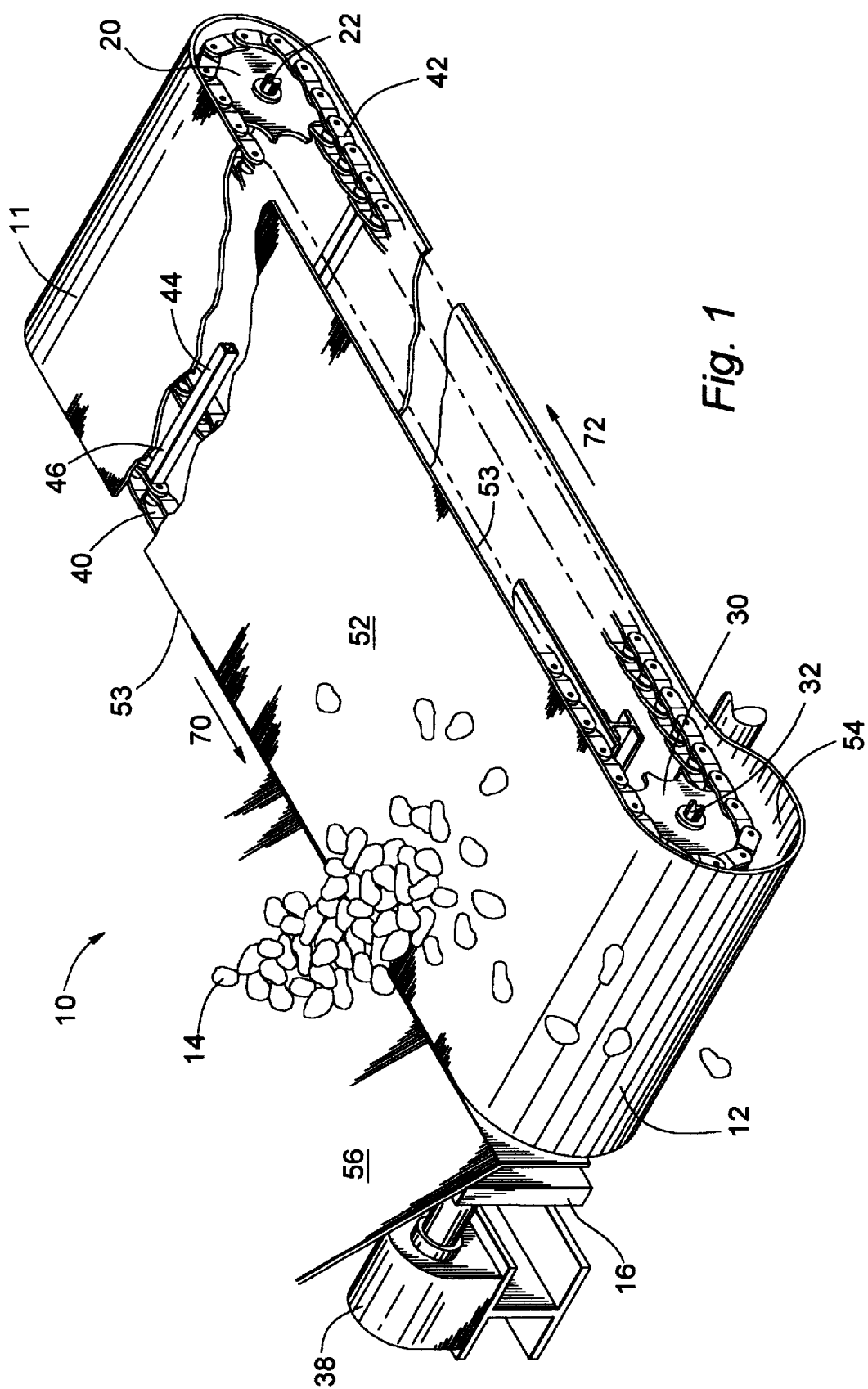
FIG. 1 is a perspective view of an embodiment of the chain driven belt discharge apparatus.
Figure 2:
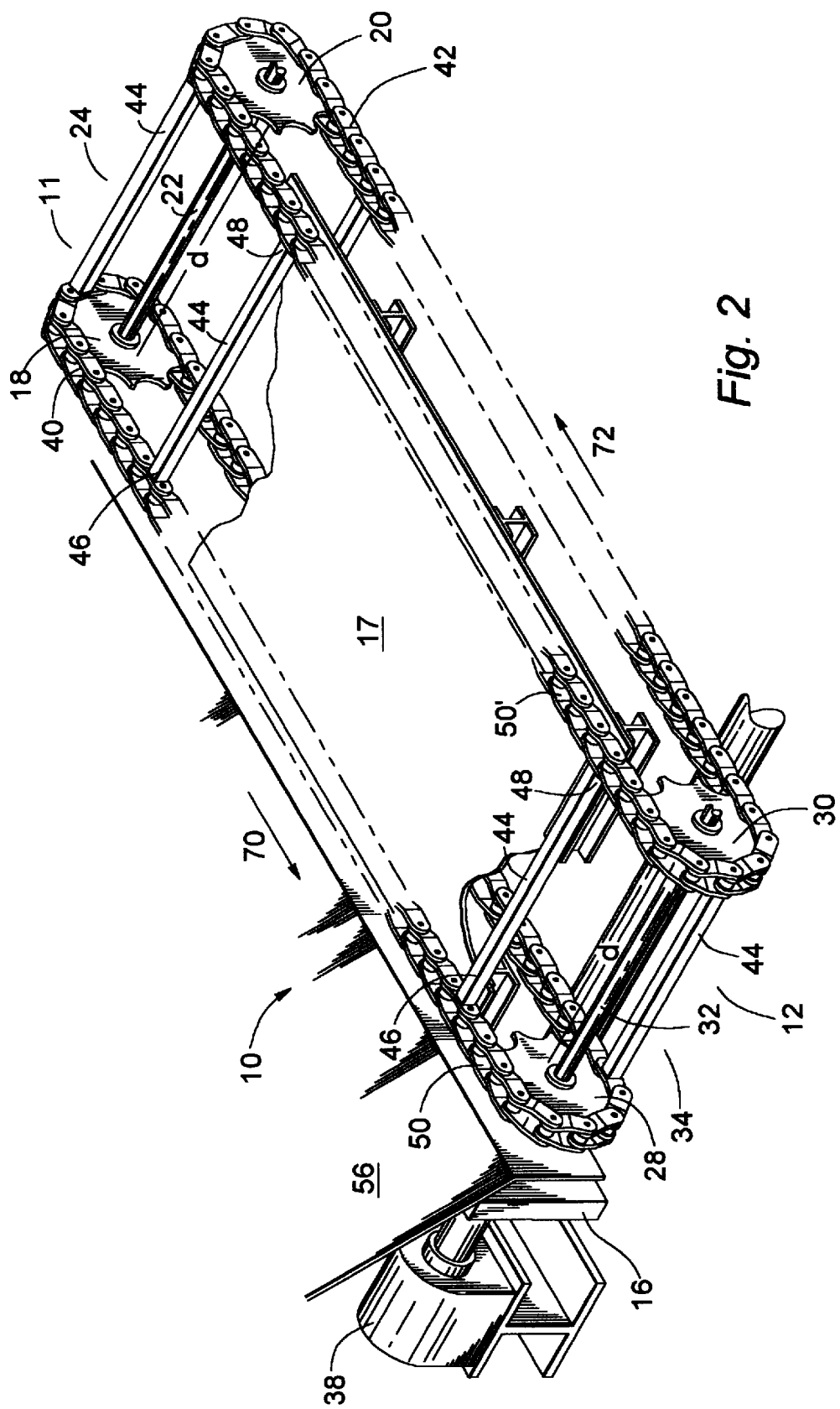
FIG. 2 is a cut-away perspective view of an embodiment of the chain driven belt discharge apparatus.

The chain driven belt discharge device 10 of the present invention is shown generally in FIGS. 1 through 4. As shown in FIGS. 1 and 2, the chain driven belt discharge device has a first end 11 and a second end 12, and is adapted for receiving bulk flow articles such as potatoes 14 or other agricultural produce (not shown). In a preferred embodiment, the chain driven belt discharge device is incorporated in a trailer 57 for bulk flow articles (See FIG. 4). In alternative preferred embodiments, the chain driven belt discharge device stands alone or is incorporated in other types of equipment, such as packing lines and the like.

The chain driven belt discharge device 10 consists of a frame 16 of typical design, and a floor 17. A first idler sprocket 18 and a second idler sprocket 20 are mounted on an idler sprocket shaft 22, spaced apart from one another at a distance d, forming an idler sprocket assembly 24. The idler sprocket assembly is mounted proximate the first end 11 of the chain driven belt discharge device in a way that allows the idler sprocket assembly to turn freely. A first drive sprocket 28 and a second drive sprocket 30 are mounted on a drive sprocket shaft 32, spaced apart from one another at distance d, forming a drive sprocket assembly 34. The drive sprocket assembly is mounted proximate the second end 12 of the chain driven belt discharge device, and is functionally engaged with a motor 38. In a preferred embodiment, the motor is a high ratio hydraulic powered motor, such as model number TF0195, manufactured by Parker Hydraulics, 16655 Noyes Avenue, Irvine, Calif., USA. Other types of drive means are also contemplated, such as an electric or gas powered motor or a power take-off (PTO).

A first endless loop drive chain 40 is engaged on the first idler sprocket 18 and the first drive sprocket 28. A second endless loop drive chain 42 is likewise engaged on the second idler sprocket 20 and the second drive sprocket 30, as shown in FIG. 2. The first endless loop drive chain and the second endless loop drive chain are parallel to one another and move in concert when the drive sprocket assembly 34 is turned by the motor 38. Each of the endless loop drive chains is comprised of a plurality of links 50. In a preferred embodiment, the endless loop chains are 3" link drive chains, such as part number D667KC manufactured by Drives Incorporated, 1009 1st Street, Fulton, Ill., USA.

A plurality of spacer bars 44, each having a first end 46 and a second end 48 are provided for maintaining the parallel position of the first endless loop drive chain 40 and the second endless loop drive chain 42 at approximately distance d apart from one another. The spacer bar first end is fastened to a link 50 in the first endless loop drive chain, and the spacer bar second end is fastened to a corresponding link 50' in the second endless loop drive chain, so that the spacer bar is perpendicular to the first and second endless loop drive chains. In a preferred embodiment, the spacer bars are fastened in place with rivets (not shown). Other fastening means are contemplated, such as screws, spot welds, bolts and the like.

Figure 3:
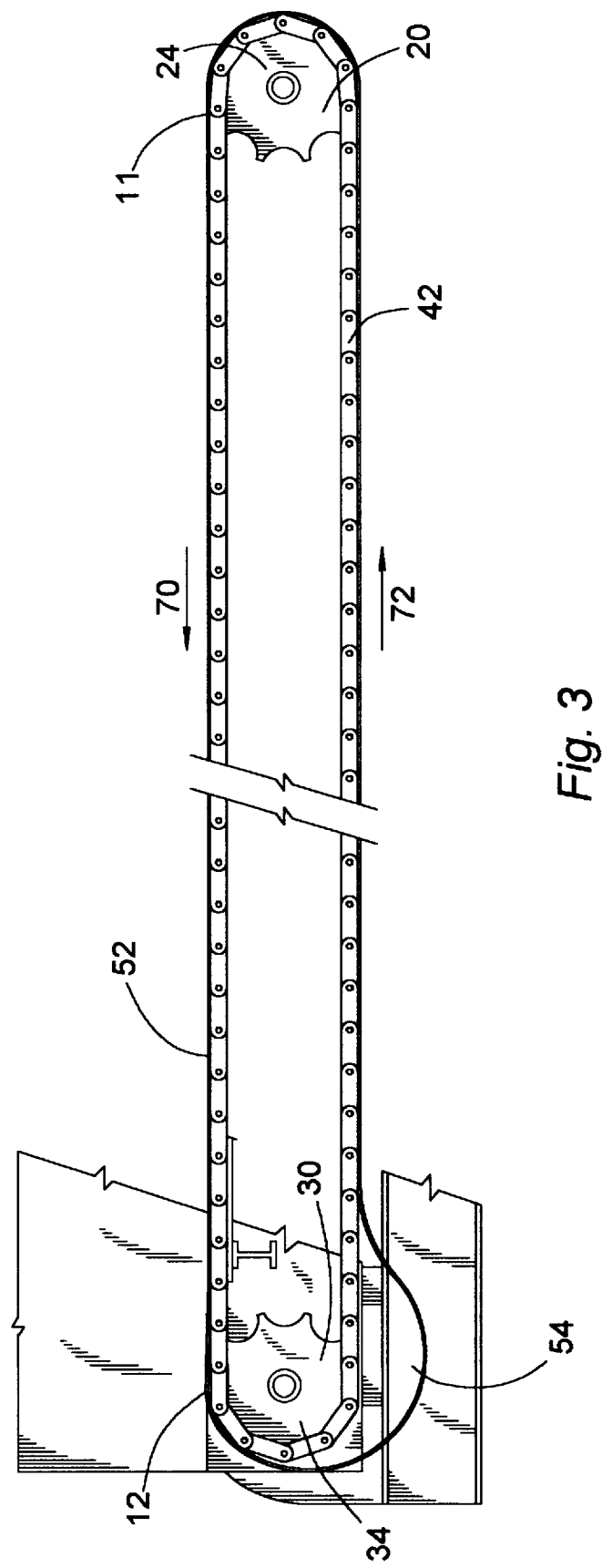
FIG. 3 is a side view of an embodiment of the chain driven belt discharge apparatus.

A conveyor belt 52 having a width approximately equal to or slightly greater than distance d, is provided as shown in FIGS. 1 and 3. In a preferred embodiment, the conveyor belt is made from flexible rubber. Alternatively, the conveyor belt may be made from other, similar materials. A belt made from fabric and rubber has been used successfully. The conveyor belt is sized to be received loosely over the endless loop drive chains without fasteners. The conveyor belt is longer than the endless loop drive chains, so that an amount of slack 54 remains in the belt when it is installed and while functioning. In a preferred embodiment, sloped side walls 56 are provided to direct bulk flow articles onto the conveyor belt 52. The width of the belt allows the belt edges 53 to contact the sloped side walls of the apparatus, thus minimizing dirt, mud, rocks and the like from sliding beneath the belt and causing damage to the endless loop drive chains.

Figure 5:
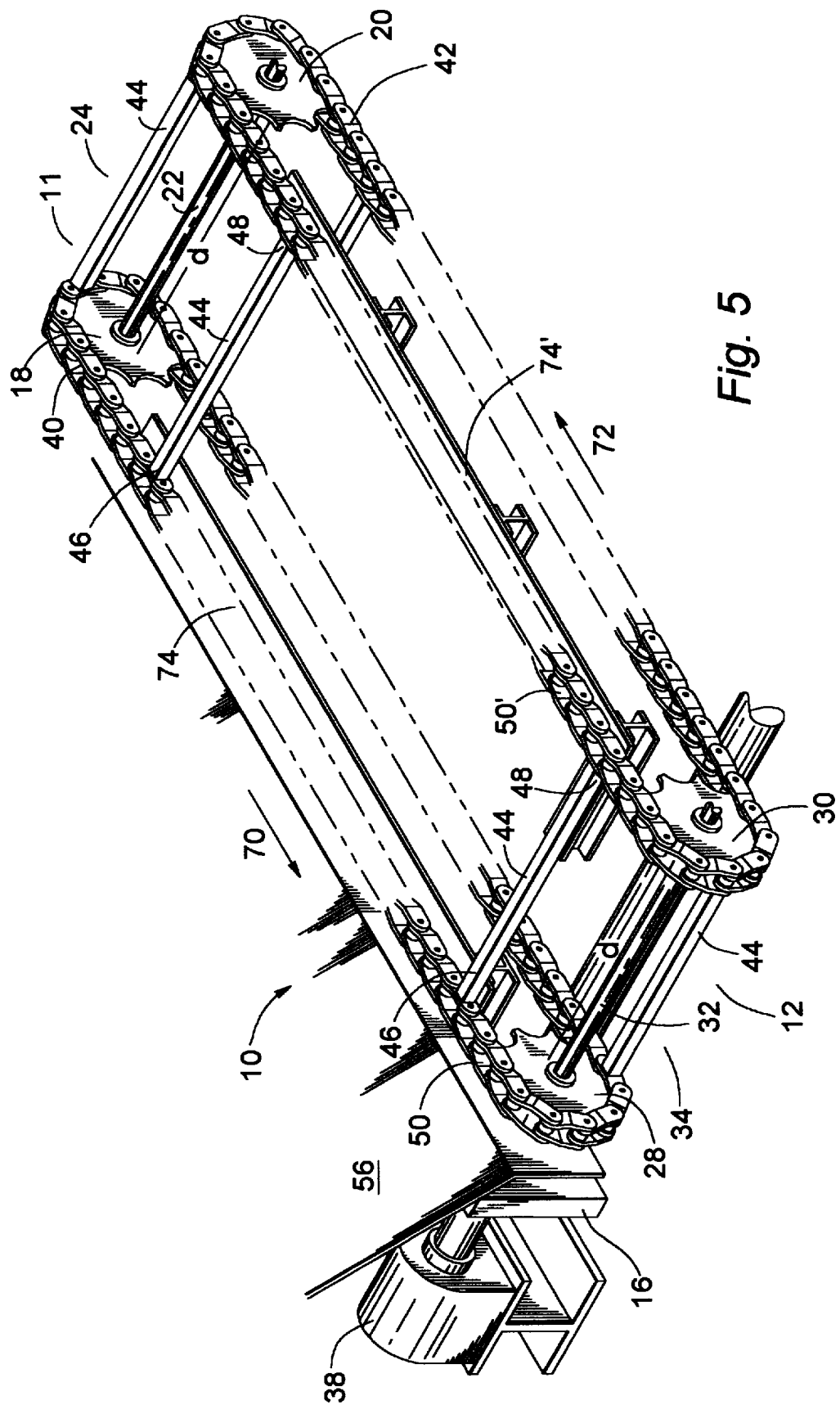
FIG. 5 is a cut-away perspective view of an additional embodiment of the chain driven belt discharge apparatus.

In the alternative preferred embodiment shown in FIG. 5, at least a pair of runners 74 and 74' extends the length of the chain driven belt discharge device 10, directly beneath and substantially parallel to the first endless loop drive chain 40 and the second endless loop drive chain 42. In this embodiment there is no floor, such as the floor 17 shown in FIG. 2. This arrangement allows dirt, rocks, mud and other debris to fall away. The runners and the spacer bars 44 support the drive chains. Preferably, the runners are made from a high molecular weight plastic to provide a low friction surface upon which the drive chains can slide.

In use, bulk flow articles are loaded onto the conveyor belt 52 of the chain driven belt discharge device 10. A switch (not shown) actuates the motor 38 to turn the drive sprocket assembly 34. As the drive sprocket assembly turns, the first endless loop drive chain 40 and the second endless loop drive chain 42 advance from the first end 11 toward the second end 12, in a rearward direction 70. The weight of the bulk flow articles presses the conveyor belt 52 against the drive chains, creating friction between the conveyor belt and the drive chains. The spacer bars 44 support the conveyor belt. As a result, the loaded conveyor belt advances toward the second end 12 of the apparatus without being fastened to the drive chains. As the bulk flow articles are discharged off the second end 12 of the apparatus, the conveyor belt continues around the drive sprocket assembly and back toward the first end 11 of the chain driven belt discharge device in a return direction 72.

Figure 4:
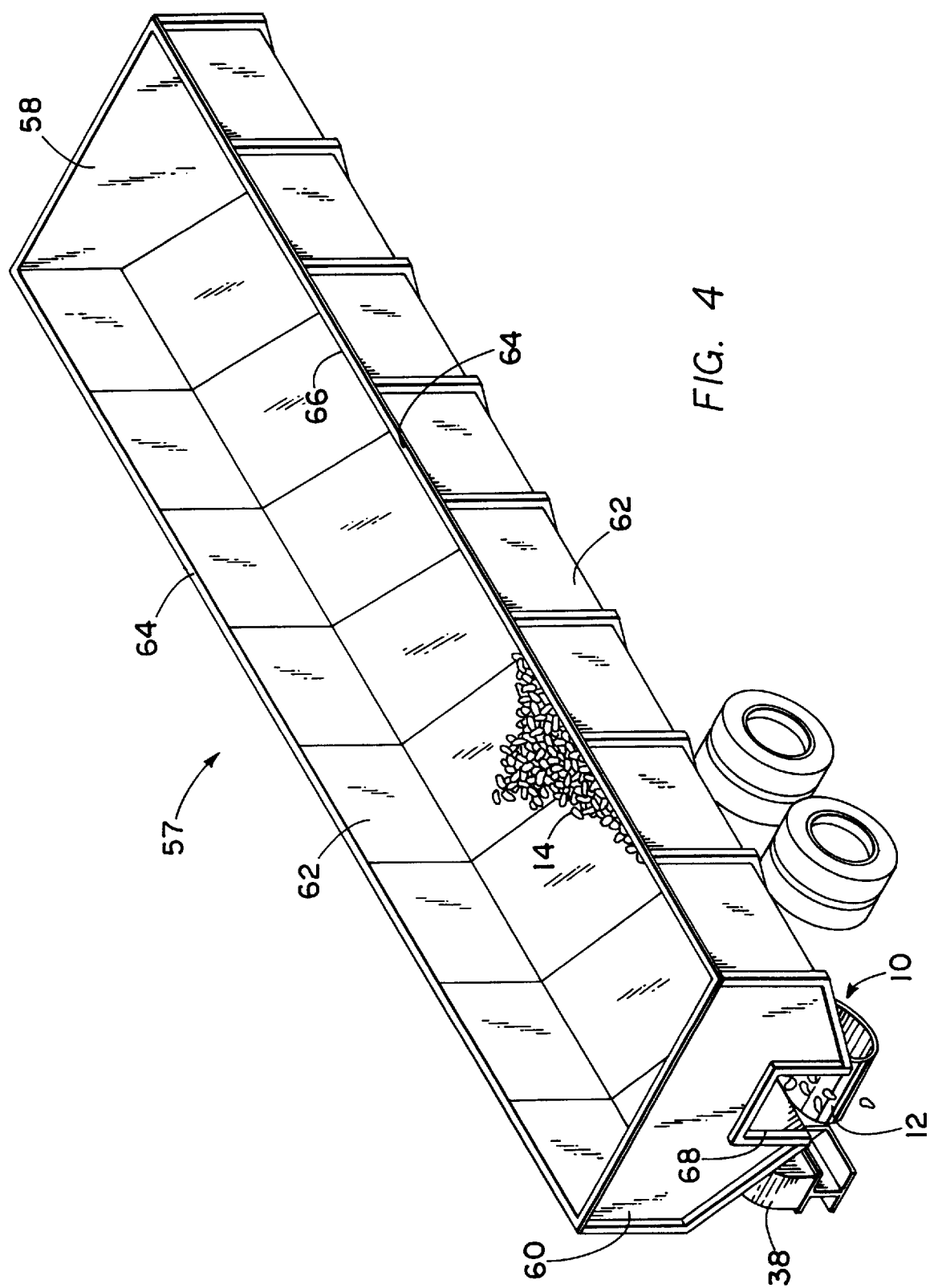
FIG. 4 is a perspective view of an alternative embodiment of the chain driven belt discharge apparatus.

In a preferred embodiment, the chain driven belt discharge device 10 is incorporated in a typical trailer 57 for bulk flow articles, as shown in FIG. 4. The trailer has a front wall 58, a rear wall 60, and opposing parallel side walls 62, each having a top edge 64 and a bottom edge 66. The side walls are sloped such that the distance between the top edges is greater than the distance between the bottom edges. In a preferred embodiment, the bottom edges of the side walls meet the trailer floor (not shown). In an alternative preferred embodiment, neither the trailer nor the chain driven belt discharge device has a floor. A pair of runners (not shown) are provided to support the drive chains in the manner shown in FIG. 5. The sloped side walls allow the contents of the trailer to slide onto the conveyor belt 52.

The first end 11 of the chain driven belt discharge device 10 is located proximate the front wall 58 of the trailer 57. The second end 12 is located proximate the rear wall 60 of the trailer. In this embodiment, the idler sprocket assembly 24 is positioned proximate the front wall 58 of the trailer. The drive sprocket assembly 34 and the motor 38 are positioned proximate the rear wall. The rear wall has a discharge gate 68 for allowing the contents of the trailer to be emptied.

In use, bulk flow articles are loaded into the trailer 57. The articles are directed to the conveyor belt 52 of the chain driven belt discharge device 10. A switch (not shown) actuates the motor 38 to turn the drive sprocket assembly 34. As the drive sprocket assembly turns, the first endless loop drive chain 40 and the second endless loop drive chain 42 advance from the first end 11 toward the second end 12, in a rearward direction 70. The weight of the bulk flow articles presses the conveyor belt 52 against the drive chains, creating friction between the conveyor belt and the drive chains. The spacer bars 44 support the conveyor belt. As a result, the loaded conveyor belt advances toward the second end 12 of the apparatus at the rear wall 60 of the trailer without being fastened to the drive chains. As the bulk flow articles are discharged from the trailer through the gate 68, the conveyor belt continues around the drive sprocket assembly and back toward the first end 11 of the chain driven belt discharge device near the front wall 58 of the trailer in a return direction 72.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited, except by the following claims, as appropriately interpreted in accordance with the doctrine of equivalents.

What is claimed is:

1. An apparatus for moving bulk flow material, the apparatus comprising
   a first end and a second end;
   a first idler sprocket and a second idler sprocket, joined by an idler sprocket shaft, to form an idler sprocket assembly, located proximate the first end;
   a first drive sprocket and a second drive sprocket, joined by a drive sprocket shaft, to form a drive sprocket assembly, located proximate the second end, the drive sprocket assembly being functionally engaged with a motor for turning the drive sprocket assembly;
   at least a first endless loop drive chain and a second endless loop drive chain, the first endless loop drive chain including a plurality of links, and sized to be functionally engaged on the first idler sprocket and the first drive sprocket, and the second endless loop drive chain including a plurality of links, and sized to be functionally engaged on the second idler sprocket and the second drive sprocket, the endless loop drive chains spaced apart from and parallel to one another; and
   a conveyor belt, the conveyor belt longer than the endless loop chains, such that the conveyor belt is received loosely on the endless loop drive chains, covering the endless loop drive chains and leaving a slack portion of the conveyor belt proximate the drive sprocket assembly in a return direction of the conveyor belt.

2. The apparatus of claim 1, wherein the belt is formed of reinforced rubber.

3. The apparatus of claim 1, wherein the motor is an electric motor.

4. The apparatus of claim 1, wherein the motor is a hydraulic motor.

5. The apparatus of claim 1, further comprising
   a plurality of runners, each runner positioned beneath and parallel to a drive chain.

6. The apparatus of claim 1, further comprising
   a pair of sloped side walls, each having a lower edge, for directing the bulk flow material onto the conveyor belt; and
   a floor extending from the first end to the second end, the width of the floor being defined by the lower edges of the sloped side walls.

7. The apparatus of claim 6, wherein the conveyor belt has a width approximately equal to or greater than the width of the floor.

8. The apparatus of claim 1, further including a plurality of spacer bars, each spacer bar having a first end and a second end, each spacer bar positioned perpendicular to the endless loop drive chains and attached at its first end to a link of the first endless loop drive chain and attached at its second end to a corresponding link in the second endless loop drive chain, the spacer bars distributed along the endless loop drive chains.

9. A trailer for bulk flow articles, the trailer comprising:
   a front wall, a rear wall, opposing parallel side walls each having a top edge and a bottom edge, the side walls being sloped such that the distance between the top edges is greater than the distance between the bottom edges, and the rear wall having a discharge gate therein;
   a floor which extends from the front wall to the rear wall along the bottom edges of the side walls, the width of the floor being defined by the lower edges of the side walls,
   a first idler sprocket and a second idler sprocket, joined by an idler sprocket shaft, to form an idler sprocket assembly, located proximate the first end;
   a first drive sprocket and a second drive sprocket, joined by a drive sprocket shaft, to form a drive sprocket assembly, located proximate the second end, the drive sprocket assembly being functionally engaged with a motor for turning the drive sprocket assembly;
   at least a first endless loop drive chain and a second endless loop drive chain, the first endless loop drive chain comprising a plurality of links, and sized to be functionally engaged on the first idler sprocket and the first drive sprocket, and the second endless loop drive chain comprising a plurality of links, and sized to be functionally engaged on the second idler sprocket and the second drive sprocket, the endless loop drive chains spaced apart from and parallel to one another; and
   a conveyor belt, the conveyor belt longer than the endless loop chains, such that the conveyor belt is received loosely on the endless loop drive chains, covering the endless loop drive chains and leaving a slack portion proximate the drive sprocket assembly in a return direction of the conveyor belt.

10. The apparatus of claim 9, wherein the belt is formed of reinforced rubber.

11. The apparatus of claim 9, wherein the motor is an electric motor.

12. The apparatus of claim 9, wherein the motor is a hydraulic motor.

13. The apparatus of claim 9, wherein the conveyor belt has a width approximately equal to or greater than the width of the floor.

14. The trailer of claim 9, further including a plurality of spacer bars, each having a first end and a second end, each spacer bar positioned perpendicular to the endless loop drive chains and attached at its first end to a link of the first endless loop drive chain and attached at its second end to a corresponding link in the second endless loop drive chain, the spacer bars distributed along the endless loop drive chains.

15. A trailer for bulk flow articles, the trailer comprising:
   a front wall, a rear wall, opposing parallel side walls each having a top edge and a bottom edge, the side walls being sloped such that the distance between the top edges is greater than the distance between the bottom edges, and the rear wall having a discharge gate therein;
   a first idler sprocket and a second idler sprocket, joined by an idler sprocket shaft, to form an idler sprocket assembly, located proximate the first end;
   a first drive sprocket and a second drive sprocket, joined by a drive sprocket shaft, to form a drive sprocket assembly, located proximate the second end, the drive sprocket assembly being functionally engaged with a motor for turning the drive sprocket assembly;
   at least a first endless loop drive chain and a second endless loop drive chain, the first endless loop drive chain comprising a plurality of links, and sized to be functionally engaged on the first idler sprocket and the first drive sprocket, and the second endless loop drive chain comprising a plurality of links, and sized to be functionally engaged on the second idler sprocket and the second drive sprocket, the endless loop drive chains spaced apart from and parallel to one another;
   at least a pair of runners, each runner positioned beneath and substantially parallel to an endless loop drive chain; and
   a conveyor belt, the conveyor belt longer than the endless loop chains, such that the conveyor belt is received loosely on the endless loop drive chains, covering the endless loop drive chains and leaving a slack portion of the conveyor belt proximate the drive sprocket assembly in a return direction of the conveyor belt.

16. The trailer of claim 15, further including a plurality of spacer bars, each having a first end and a second end, each spacer bar positioned perpendicular to the endless loop drive chains and attached at its first end to a link of the first endless loop drive chain and attached at its second end to a corresponding link in the second endless loop drive chain, the spacer bars distributed along the endless loop drive chains.

17. A method for unloading agricultural produce from a trailer, the method comprising the steps of:

provos the trailer with a chain driven belt discharge system, including an idler sprocket assembly, a drive sprocket assembly, at least a pair of endless loop drive chains functionally engaged with the idler sprocket assembly and the drive sprocket assembly;

loosely engaging the conveyor belt on the endless loop drive chains to form a slack portion of the conveyor belt proximate the drive sprocket assembly in a return direction of the conveyor belt;

activating a motor to turn the drive sprocket assembly and advance the endless loop drive chains;

allowing the weight of the agricultural produce to press the conveyor belt against the endless loop drive chains, thus creating friction which causes the conveyor belt to advance with the endless loop drive chains; and discharging the agricultural produce out a discharge gate of the trailer.

18. The method of claim 17, further including the step of interconnecting the pair of endless loop chains with a plurality of spacer bars to maintain a distance between the endless loop drive chains.

* * * * *